United States Patent [19]

Vaughan

[11] Patent Number: 5,310,465
[45] Date of Patent: May 10, 1994

[54] ELECTRODIALYTIC OXYDATION-REDUCTION OF METALS

[76] Inventor: Daniel J. Vaughan, 36 Paxon Dr., Wilmington, Del. 19803

[21] Appl. No.: 23,045

[22] Filed: Feb. 19, 1993

Related U.S. Application Data

[63] Continuation of Ser. No. 537,460, Jun. 14, 1990, abandoned.

[51] Int. Cl.$^5$ .............................................. B01D 61/44
[52] U.S. Cl. ............................ 204/182.4; 204/182.5; 204/151; 204/301
[58] Field of Search .................. 204/182.4, 182.5, 151, 204/301

[56] References Cited

U.S. PATENT DOCUMENTS

| | | | |
|---|---|---|---|
| 2,921,005 | 1/1960 | Bodamer | 204/182.4 |
| 4,260,463 | 4/1981 | Rideout | 204/98 |
| 4,636,288 | 1/1987 | Vaughan | 204/182.4 |

*Primary Examiner*—John Niebling
*Assistant Examiner*—Arun S. Phasge

[57] ABSTRACT

Oxidation and reduction reactions are carried out in a continuous aqueous solution having an acidic part and an alkaline part formed by electrolysis and electrodialysis of an acidic electrolyte separated by a cation permeable membrane from an alkaline electrolyte containing a soluble anion of an acid whereby hydrogen ions are electrotransported from an acidic electrolyte through a cation permeable membrane into said alkaline electrolyte to form the acidic part. Reactions are carried out in the acidic or alkaline part or simultaneously or successively in the acidic and alkaline parts by adding reactants to said alkaline electrolyte and passing electricity through said electrolysis and electrodialytic process. Chromium$^{+6}$ in the alkaline part is reduced to chromium$^{+3}$ in the acidic part by addition of sulfur dioxide to the alkaline part and the chromium$^{+3}$ is precipitated by hydroxyl ions in the alkaline part.

7 Claims, No Drawings

ELECTRODIALYTIC OXYDATION-REDUCTION OF METALS

This is a continuation of application Ser. No. 07/537,460, filed Jun. 14, 1990 now abandoned.

FIELD OF THE INVENTION

This invention relates broadly to chemical reactions in acidic and alkaline aqueous solutions and more specifically to reactions in an electrodialytic process having acidic and alkaline electrolytes. Specifically the invention relates to reactions, especially oxidation and reduction reactions, in an electrodialytic process having a continuous aqueous phase electrolyte part of which is acidic and part of which is alkaline.

The invention comprises passing electricity through an electrodialytic cell having an acidic electrolyte in communication with the cell anode that is separated by a cation permeable membrane from an alkaline electrolyte comprising a soluble salt of an acid and reactants in electrical communication with the cell cathode whereby the alkaline electrolyte becomes part acidic and part alkaline and the reactants react in the acidic part, the alkaline part or both parts simultaneously or successively. The process of this invention is especially useful for reduction of chromium$^{+6}$ in the acidic part by the addition of sulfur dioxide to the alkaline part and precipitating the chromium$^{+3}$ by hydroxyl ions in the alkaline part. The acidic part and alkaline part in a continuous liquid is formed and maintained by electrolysis and electrodialysis with electricity. The process of this invention provides a unique and versatile means for carrying out a multitude of chemical reactions in an acidic or an alkaline aqueous solution.

BACKGROUND OF THE INVENTION

The electrodialytic processes as disclosed in my U.S. Pat. No. 4,636,288 provide a broadly applicable method for the electrodialytic conversion of multivalent metal salts in aqueous solutions into the acid or halogen of the salt anion and the hydroxide or insoluble salt of the metal cation. These salt splitting processes comprise the electrotransport of multivalent metal cations through a cation permeable membrane into an aqueous solution or catholyte containing a soluble salt of an acid which acid in a one normal solution would have a pH no greater than three and forms a water soluble salt of a multivalent metal cation and agents that insolubilize or ionically immobilize multivalent metal cations. The aqueous solutions receiving the multivalent metal cations are generally alkaline, having a pH greater than seven. These processes are used broadly for the purification and restoration of solutions containing chromic acid that are used for electroplating, anodizing, chromating and etching metals and plastics. At times trace quantities of chromate ions enter the alkaline catholyte and it is necessary to remove the chromate ions or to reduce the chromate ion to chromium$^{+3}$ and to precipitate chromium$^{+3}$ hydroxide to meet requirements for disposal of the alkaline catholyte. It is known that chromate ions can be reduced in acidic solutions, having a pH of about three, with reducing agents such as sulfur dioxide, sodium bisulfite and ferrous sulfate. The reactions are usually carried out in excess acid to complete the reactions and the reaction solution is then made alkaline to precipitate the chromium$^{+3}$. It would be preferable that the chromate ions in the alkaline electrolyte be converted in the electrolyte without acidification and the electrolyte could be used continuously. It is an object of the instant invention to provide a method for conversion of chromate to chromium$^{+3}$ ions in the alkaline electrolyte.

Oxidation and reduction reactions have been researched extensively and reported in literature. These reactions must always occur simultaneously. The element, compound or ion which has been reduced gains electrons from some element, compound or ion which is thereby oxidized. Every reaction involving an exchange of electrical charges is an oxidation-reduction reaction. It is not strictly accurate to describe the change merely as an oxidation or reduction reaction but often for simplicity reactions which involve oxidation-reduction are described as oxidation if the accompanying reduction is of subordinate interest. Hydrogen occupies an intermediate position in the electromotive series of elements. Consequently it acts as an oxidizing agent towards the metals which precede it and a reducing agent towards those which follow it in the series. The terms oxidizing agent and reducing agent depend upon the nature of the substance and the reaction environment with which it is brought into contact. It is known that pH of the reaction environment is an important variable in oxidation-reduction and most chemical reactions.

It is an object of this invention to provide a process for forming and maintaining with electricity a reaction environment that is a continuous liquid part acidic and part alkaline for carrying out oxidation-reductions and other chemical reactions.

Electrodialysis is a well know art (See U.S. Pat. Nos. 4,325,792; 4,439,293; 4,636,288; 4,652,351 and 4,684,453 the disclosures of which are incorporated by reference). Electrodialysis is the transport of ions through ion permeable membranes as a result of an electrical driving force. The process is commonly carried out in an electrochemical cell having a cathode compartment containing a cathode and a catholyte and an anolyte compartment containing an anode and anolyte, the catholyte and anolyte compartments being separated by ion permeable membranes. Electrodialysis can be carried out in cells containing more than two compartments and more than two electrolytes. When electricity is passed through an electrodialytic cell, cations tend to go to the cell cathode and anions to the cell anode. Oxidation occurs at the cell anode and reduction at the cell cathode. Water is electrolyzed to hydrogen ions and oxygen and hydroxyl ions and hydrogen. The electrodialytic conversion of multivalent metal salts is disclosed in U.S. Pat. No. 4,636,288.

SUMMARY OF THE INVENTION

This invention provides a process for carrying out reactions, especially oxidation-reduction, in an aqueous liquid that is part acidic and part alkaline. The reactions are carried out in the acidic part or the alkaline part or in both parts simultaneously or successively. The process comprises passing electricity through an electrodialytic cell having an anolyte compartment containing an anode and an acidic anolyte that is separated by a cation permeable membrane from a catholyte compartment containing a cathode and an alkaline catholyte comprising a soluble salt of an acid to which is added reactants capable of reacting in an acidic or alkaline solution. The acidic part of the catholyte is formed and maintained by electrolysis and electrotransport of hydrogen ions from the anolyte to the catholyte. As a result, the acidic part varies with rate of transport of hydrogen ions, the concentration of anions of acids in the alkaline part, the strength of the acid of the anions and the pH of the alkaline part. The alkaline part is maintained by hydroxyl ions formed at the cell cathode. The process of this invention provides an unusual and versatile environment for carrying out reactions in alkaline and acidic solutions. For example, chromium$^{+6}$ in the alkaline part is reduced in the acidic part by adding sulfur dioxide to the alkaline part and the chromium$^{+3}$ formed in the acidic part is precipitated in the alkaline by hydroxyl ions formed at the cell cathode. Cyanides are oxidized in the alkaline part by adding chlorine and the cyanate formed in the oxidation is converted to ammonia and carbon dioxide in the acidic part.

DETAILED DESCRIPTION OF THE INVENTION

I have now found that chromium$^{+6}$ can be reduced by adding sulfur dioxide or sodium metabisulfite to an alkaline electrolyte containing chromium$^{+6}$ if the alkaline electrolyte comprising a soluble salt of an acid is separated by a cation permeable membrane from an acidic electrolyte whereby the alkaline electrolyte is receiving hydrogen ions from the acidic electrolyte. Surprisingly, I have found that the alkaline electrolyte comprises an acidic part and an alkaline part that is formed and maintained by electrolysis and electrotransport of hydrogen ions from an acidic electrolyte to an alkaline electrolyte containing a soluble salt of an acid. There are several variables affecting the formation and maintenance of an acidic and alkaline media in the "reactor" electrolyte. When the reactor electrolyte does not contain a soluble salt of an acid, is not separated from an acidic electrolyte by a hydrogen ion permeable membrane and there is no electricity passing through the cell, there is no apparent acidic media in the reactor electrolyte. The acidic media is apparently formed by electrolysis and electrotransport of hydrogen ions into an alkaline electrolyte comprising anions of an acid. The extent or volume of the acidic media varies with (a) rate of transport of hydrogen ions or electrodialysis rate; (b) the anion of a weak or strong acid; (c) the concentration of acid anions in the alkaline electrolyte and (d) the pH of the alkaline electrolyte. The extent or volume of the acidic media increases with increasing rate of transport of hydrogen ions, concentration of anions of acids, strength of acids of anions and with a decreasing pH and concentration of hydroxyl ions in the alkaline electrolyte. It appears that the acidic media covers and extends from the surface of the membrane facing the alkaline electrolyte containing a salt of an acid. The acidic electrolyte can be the anolyte or any acidic electrolyte from which hydrogen ions are being electrotransported through a cation permeable membrane into an alkaline electrolyte containing a soluble salt of an acid and reactants capable of reacting in the acidic media, the alkaline media or both. The alkaline or reactor electrolyte can be a catholyte or any alkaline electrolyte containing a salt of an acid and receives hydrogen ions from a cation permeable membrane that contains an acidic and an alkaline part and reactants capable of reacting in the reactor electrolyte.

Any soluble salt of an acid can be used in the alkaline electrolyte of the electrodialytic process of this invention. Preferable the soluble salt is a salt of an acid which acid in a one normal solution would have a pH no greater than three. The most preferred soluble salts are alkali salts of acids of sulfur, halogen, nitrogen, phosphorus and carbon, which acids in a one normal solution would have a pH of less than three and preferably of two or less. Mixtures of soluble salts of acids of different cations and anions can be used to effect formation of an acidic media in the alkaline electrolyte. It is known that pH has a significant effect on reactions and it will be apparent to those skilled in the art that soluble salts of acids can be selected for establishing a preferred pH in the acidic media. The concentration of the soluble salt of an acid in the alkaline electrolyte can be varied over a wide range from a saturated solution to about 200 ppm. It is preferable to use a high concentration of the soluble salt having anions of a strong acid to operate with a large volume of acidic media and at the lowest pH of the acid of the salt anion. A salt of a strong acid is preferred to obtain a low pH in the acidic media. It will become apparent to one skilled in the art, the concentration of the soluble salt, the strength of the acid of the salt anion and the current density of the electrolysis must be sufficient to effect the desired acidic reaction media in the alkaline electrolyte.

The acidic electrolyte can be an anolyte or any acidic electrolyte in electrical communication with the cell anode that is separated by a cation permeable membrane from the alkaline electrolyte containing a salt of an acid and reactants capable of reacting in an alkaline or acidic media whereby hydrogen ions are electrotransported from the acidic electrolyte to the alkaline electrolyte. The acidic electrolyte can comprise any acid, preferably the acid is an acid of sulfur and the acidic electrolyte is the anolyte.

The electrodialytic cells of this invention can have two or more compartments. A two compartment cell has an anolyte and a catholyte compartment separated by a cation permeable membrane. The anolyte compartment has an anode and an acidic anolyte. The catholyte has a cathode and an alkaline catholyte comprising a soluble salt of an acid and reactants capable of reacting in an alkaline or acidic media. A three compartment cell has an anolyte compartment, a third or center compartment and a catholyte compartment separated by all cation permeable membranes or a combination of cation and anion permeable membranes provided that the membrane separating the acidic electrolyte from the alkaline electrolyte comprising a soluble salt of an acid is permeable to hydrogen ions. The electrolyte in the third compartment can be the alkaline electrolyte with reactants and soluble salt or an acidic electrolyte. The anolyte in a three compartment cell can be an acidic electrolyte when the alkaline electrolyte is in the third compartment and the catholyte can be acidic or alkaline with or without a salt of an acid. When the catholyte is the alkaline electrolyte with a salt of an acid and reactants the third compartment must be an acidic electrolyte. In a cell having more than three compartments, the compartments can be separated by all cation permeable membranes or combinations of cation, anion, bipolar membranes and porous separators provided that the membrane between the acidic electrolyte from which hydrogen ions are being electrotransported to the alkaline electrolyte comprising a salt of an acid and reactants is permeable to hydrogen ions. Any cation permeable membrane can be used to separate compartments of the electrodialytic cells of this invention. These cation permeable membranes have fixed negative charges distributed in the polymer matrix and are permeable to positively charged ions. The membranes are preferably membranes of hydrocarbon and halocarbon polymers containing acids and acid derivatives. Particularly suitable acid polymers are perhalocarbon polymers containing sulfonic, sulfoamide and carboxylic acid groups. The membranes may be a multi-layered structure of different polymers and contain filters, reinforcements and chemical modifiers. The preferred membranes are substantially chemically stable to the process conditions and mechanically suitable for design and economical operation of the electrodialytic process.

A continuous liquid part alkaline and part acidic with no separator between the alkaline part and the acidic part is an unusual and broadly applicable reaction environment. Any reaction carried out in an alkaline or acidic aqueous solution can be carried out in the process of this invention. A reactant can be electrotransported through the membrane or added to the reaction environment. A gas such as sulfur dioxide can be added to the alkaline media where it is adsorbed and forms a stable salt that can react with, for example, chromate ions to reduce chromium$^{+6}$ to chromium$^{+3}$ in the acid part and the chromium$^{+3}$ reacts with hydroxyl ions in the alkaline part to form an insoluble chromic hydroxide that can be removed from the alkaline part. Cyanides can be oxidized by hypochlorite, chlorine or hydrogen peroxide in the alkaline part and the cyanate formed in the oxidation decomposed to carbon dioxide and ammonia in the acidic part while the unreacted hydrogen peroxide or hypochlorite remains stable in the alkaline part. Reactions can be carried out simultaneously or successively in the alkaline part and the acidic part. Multi valent metal cations can be electrotransported from an acidic electrolyte and oxidized or reduced in the acidic or alkaline part. The acidic part and the alkaline part are continuously formed and maintained by electrolysis and electrotransport of hydrogen ions. It will become apparent to those skilled in the art that the contact time of reactants in the acidic part can be controlled and that reactants can be stored in the alkaline part and metered into the acidic part for reaction. It will also become apparent to those skilled in the art that the process of this invention can be used for carrying out a multitude of inorganic and organic reactions using parameters of electrolysis, electrodialysis and reactions in alkaline and acidic aqueous media.

To illustrate the practice of the instant invention an electrodialytic cell was assembled having an anolyte compartment containing an anode and an anolyte and a catholyte compartment containing a cathode and catholyte. The compartments were separated by a cation permeable membrane. The cell was constructed of glass having a ground joint on each compartment for placing and sealing a membrane for separating the compartments. The two surfaces of the membrane and the anode and cathode were visible. The gap between anode and cathode was 3.0 inches. The anode was made of a titanium mesh coated with iridium oxide and the cathode was a titanium mesh electrocoated with nickel. The electrolysis area of the cell was 0.9 sq. inches and the membrane separating the compartments was Nafion 417 perfluorinated membrane obtained from Dupont. The power supply was custom made and equipped to operate at fixed voltage variable current.

EXAMPLE 1

To the assembled cell, a 5 wt. % solution of sulfuric acid was added to the anolyte compartment and a solution of 10 wt. % sodium sulfate and 2 wt. % sodium carbonate to the cathode compartment. The initial current was 0.4 amperes and the applied voltage was 10 at ambient temperature. After about five minutes two drops of a methyl orange indicator was added to the catholyte to observe the acidic and alkaline parts. The indicator was yellow except for a volume of solution near the membrane that was red-orange indicating an acidic media. The acidic media extended from the membrane for about 0.2 inches. Increasing the current density (amperage) from about 0.4 amperes to 0.8 amperes increased the volume of the acidic media from about 0.2 inch to about 0.3 inch and reducing the current from about 0.4 ampere to 0.1 ampere resulted in a decrease in the acidic volume. The catholyte solution was changed and the experiment repeated with methyl violet. The acidic media was yellow and the alkaline media blue. There appeared to be a gradient in the acidic media with the lowest pH, highest acidity, near the interface of the membrane and catholyte. The catholyte solution was changed (same salt composition) and phenolphthalin was added to the catholyte and the experiment repeated. The catholyte near the membrane was colorous. The volume of the acidic media appeared to be larger at each current setting than when using methyl orange. At the higher current setting a diffusion or mixing region of the media could be observed in the catholyte. At no current flow only the surface of the membrane appeared to be colorous.

The used catholyte was replaced with new catholyte and 1 gram of chromium trioxide and 4 grams of sodium metabisulfite were added to the catholyte. A current of 0.4 amperes was passed through the cell for 30 minutes and a sample of catholyte taken for analysis. The catholyte contained a precipitate of chromium hydroxide and less than one (1) ppm of hexavalent chromium. The electrolysis was continued for thirty minutes and a sample of catholyte showed no detectable hexavalent chromium.

The catholyte solution was changed to a solution containing 0.5 wt. % sodium hydroxide and 10 wt. % sodium sulfate. The cell was operated at 0.5 amperes with addition of 0.5 grams of chromium trioxide and 1.8 grams of sodium bisulfite to the catholyte. After ten minutes a sample of catholyte was analyzed for hexavalent chromium using a Kocur spot test. There was less than one (1) ppm hexavalent chromium. The catholyte contained a precipitate of chromic hydroxide.

These experiments show that there are two media, an acidic and an alkaline media and that oxidation-reduction reactions can be carried out in the acidic part and that the oxidizing or reducing agent can be stabilized in the alkaline part and reacted in the acidic part.

EXAMPLE 2

To further illustrate the practice of the instant invention an electrodialytic cell was assemble having three compartments. An anolyte compartment containing an anode and an anolyte, a center compartment containing an electrolyte but no electrode, and a catholyte compartment containing a cathode and catholyte. The compartments were separated by cation permeable membranes. The cell had an electrolysis area of seven (7) square inches and was equipped for adding and removing solutions from the three compartments. The anode was a titanium mesh having a coating of platinum and the cathode was a copper mesh electroplated with nickel. The cation permeable membranes were Nafion 324 obtained from Dupont. The d.c. power supply was made by Hewlett Pakcard and equipped to operate at constant current and variable voltage. A series of experiments was run in the cell at a current of 3.5 amperes wherein the solutions and reactants in the cell compartments were varied as described.

A 5 wt. % solution of sulfuric acid was added to the anolyte compartment, a 10 wt. % sodium sulfate and 2 wt. % sodium hydroxide solution was added to the center (third compartment) and a 5 wt. % solution of sodium hydroxide to the catholyte compartment. Sodium hydroxide from the catholyte compartment was added to the center compartment to maintain the pH at 10 to 11. The solution temperature was maintained at 50° to 52° C. A solution containing sodium cyanide and a solution containing sodium per carbonate were added slowly to the center compartment during electrodialysis. The ratio of peroxygen to cyanide was 1.9. There was an odor of ammonia mostly in the catholyte during the addition. After terminating the additions, the electrolysis was continued for one hour and the center compartment solution tested for cyanide and cyanate. The residual cyanide was 3 to 5 ppm as measured by a Kocur spot test based on silver nitrate and p-dimethyl amino benzalkodamine. There was no detectable cyanate. The formation of ammonia indicates that cyanide was oxidized to cyanate in the alkaline media and the cyanate converted to carbon dioxide and ammonia in the acidic media. The electrolyte in the center or third compartment was replaced with a new solution comprising 7 wt. % sulfuric acid and 2 wt. % ferrous sulfate, the catholyte solution was changed to a solution containing 10 wt. % sodium sulfate and 10 wt. % sodium carbonate and 0.5 wt. % sodium chromate. On electrolysis the ferrous cations were electrotransported through the membrane and reacted with the chromate ion to form ferric cations and chromium $^{+3}$. The chromium$^{+3}$ and ferric cations were precipitated as hydroxides. Some ferrous ions were precipitated as hydroxide. The catholyte contained contained less than 1 ppm of chromate. Sodium metabisulfite was added to the catholyte to effect reduction of ferric cations to ferrous ions. About 80% of the ferric ions were reduced. The electrolysis was terminated and the catholyte solutions replaced with a solution of 10 wt. % sodium sulfate and 5 wt. % sodium carbonate. Two (2) wt. % ferrous sulfate was added to the anolyte. The third, center, compartment was a solution of 7 wt. % sulfuric acid, 2 wt. % ferrous sulfate. On electrolysis the ferrous sulfate was partially oxidized to ferric sulfate and the ferric and ferrous cations electrotransported into the center compartment and into the catholyte where they were precipitated as hydroxides.

The ratio of ferrous/ferric was 2 0 to 2.5. The catholyte was replaced with a solution of 10 wt. % sodium sulfate, 1.0 wt. % sodium hydroxide and 1.0 wt. % sodium meta bisulfite and the electrolysis continued. The precipitate in the catholyte was about 95% ferrous hydroxide indicating reduction of ferric ions to ferrous ion. The catholyte solution was changed to a 5 wt. % solution of sodium chloride and 5 wt. % sodium carbonate and 1 wt. % hydrogen peroxide. On electrolysis, the catholyte precipitate was substantially ferric hydroxide indicating oxidation of the ferrous ions.

I claim:

1. The process which uses an electrodialytic cell having anolyte and catholyte compartments separated by a cation permeable membrane comprising the steps of:
   a) supplying an acidic anolyte to the anolyte compartment;
   b) supplying an alkaline catholyte to the catholyte compartment;
   c) connecting the anode and cathode of the anolyte and catholyte compartments to a current source to produce hydrogen ions at the anode and hydroxide ions at the cathode;
   d) adding a soluble anion of an acid to be removed to the catholyte compartment;
   e. supplying electrical current in such an amount to electrolyze the water in the solution at the anode to form hydrogen ions which are electrotransported through said cation permeable membrane and into the catholyte compartment resulting in formation of an acidic zone in the catholyte compartment immediately adjacent the membrane and an alkaline zone adjacent the cathode;
   f) feeding a chemical reactant to the catholyte compartment which will chemically react with said soluble anion of the acid in one of the zones in the catholyte compartment to form gaseous or solid reaction products; and
   g) removing said reaction products.

2. The process of claim 1, wherein said alkaline catholyte is at least one of a hydroxide, carbonate or bicarbonate of an alkali cation or of ammonium ion.

3. The process of claim 1, wherein said acidic anolyte in said anolyte compartment is selected from an acid of sulfur, halogen, nitrogen, phosphorous and carbon.

4. The process of claim 1, wherein the undesirable soluble acid ion is the chromate ion, the chemical fed to the catholyte is a reducing agent which will chemically react with said chromate ion in said acidic zone of the catholyte compartment to precipitate insoluble chromic hydroxide.

5. The process of claim 4, wherein said reducing agent is selected from the group consisting of sodium bisulfite, sulfur dioxide and ferrous sulfate.

6. The process of claim 1, wherein the undesirable soluble acid ion is the cyanide ion, the chemical fed to the catholyte is an oxidizing agent which will chemically react with said cyanide ion in said alkaline zone of the catholyte compartment to produce a cyanate ion which will react with hydrogen ions in the acidic zone to produce ammonia and carbon dioxide in the catholyte compartment.

7. The process of claim 6, wherein said oxidizing agent is selected from the group consisting of hydrogen peroxide, chlorine and sodium oxychloride.

* * * * *